Patented June 9, 1925.

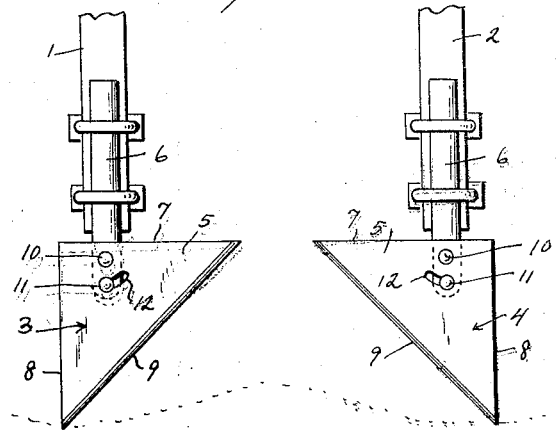
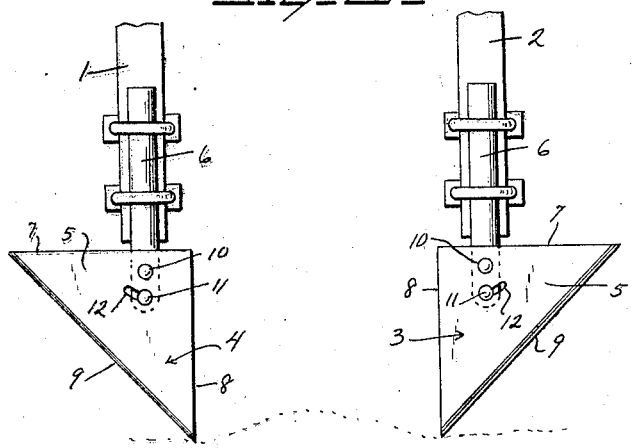
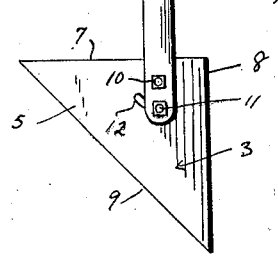

1,541,010

UNITED STATES PATENT OFFICE.

STACHES T. VACEK, OF RICHMOND, TEXAS.

CULTIVATOR SWEEP.

Application filed February 9, 1924. Serial No. 691,829.

To all whom it may concern:

Be it known that I, STACHES T. VACEK, a citizen of the United States, residing at Richmond, in the county of Fort Bend and State of Texas, have invented certain new and useful Improvements in Cultivator Sweeps, of which the following is a specification, reference being had to the accompanying drawings.

This invention relates to an improved construction for cultivators and one object of the invention is to provide a sweep which will be used in connection with a conventional construction of cultivator and includes an improved type of blade and improved means for mounting the blade. The cultivator will be provided with a pair of blades having shanks for connection with the arms of the cultivator and it is intended to have these shanks interchangeable in the arms of the cultivator so that the blades may be positioned with respect to each other to move earth towards or away from the plants.

Another object of the invention is to so mount the blades upon the shanks that the blades extend forwardly beyond the lower ends of the shanks and to so mount the blades that they may be swung transversely to adjusted positions and releasably held in adjusted positions.

This invention is illustrated in the accompanying drawings, wherein:—

Figure 1 is a view in front elevation showing the sweeps connected with the cultivator arms and mounted to move earth towards plants being cultivated.

Figure 2 is a view similar to Figure 1 with the blades mounted to move earth away from the plants being cultivated.

Figure 3 is a view of one of the sweeps, the view being in rear elevation.

The cultivator will be of a conventional construction and will include a pair of depending arms 1 and 2. The cultivator has not been shown in detail as it is of the conventional construction and, therefore, it is only necessary to show the depending arms with which the sweeps will be connected.

Each of the sweeps, which are indicated in general by the numerals 3 and 4, has been provided with a blade 5 and a shank 6. The blade 5 is triangular in shape and is provided with a rear edge 7, a side edge 8, which extends forwardly and at substantially right angles to the rear edge 7, and a cutting edge 9, which extends diagonally from the rear edge to the forward end of the side edge 8. The shank 6 has its lower end portion extending in overlapping relation across the rear end portion of the blade 5 and terminates intermediate the length of the blade. Therefore, the blade will extend well beyond the lower end of the shank and when the blade is in operative engagement with the ground, proper action of the blade will not be interfered with by the lower end of the shank. This also prevents the fasteners from contacting with the ground and therefore prevents the fasteners from being accidentally worked loose or broken off. In order to pivotally connect the blade with the shank there has been provided a fastener 10 which will preferably be a bolt. This fastener 10 passes through the lower portion of the shank and through the blade so that the blade may be swung upon this bolt to position it in the desired angular relation to the shank. In order to limit swinging movement of the blade and provide means for securely but releasably holding the blade in the adjusted position there has been provided a fastener bolt 11 which extends through the shank beneath the fastener 10 and passes through an elongated opening 12 which extends transversely of the blade. By having the bolt 11 passing through the elongated opening or slot 12 the extent to which the blade may be swung will be limited. After the blade has been swung to the desired position the securing nut for the bolt 11 may be tightened and the blade will be securely held in the adjusted position.

When the cultivator is in use and it is desired to move earth towards the plants the shanks of the two sweeps 3 and 4 will be connected respectively with the arms 1 and 2 and the blades will then be positioned with their inclined cutting edges 9 positioned inwardly and extending forwardly in flaring relation. The shanks are so connected with the arms 1 and 2 that they may be rotated to turn the blades to a desired position according to the amount of ground which it is desired to cover. After the blades have been turned to the proper position the fastener means connecting them with the arms will be tightened and the blades will be securely held in the desired position. It may also be desired to adjust the blades transversely and if so, the securing nuts of the bolts 11 will be loosened and the blades then swung to the desired position and the securing nuts again tightened. If it is desired to have the earth moved away from the plants upon the opposite sides of which the blades move when the cultivator is in use, the sweeps will be removed from the arms 1 and 2 and transposed so that the sweep 4 will be connected with the arm 1 and the sweep 3 with the arm 2. When so mounted the cutting edges of the blades will be positioned outwardly and will extend rearwardly in diverging relation so that the earth will be moved away from the plants instead of being thrown towards the plants. It will thus be seen that with this construction the blades may be properly adjusted to act upon the earth in the desired manner and that they may be caused to cover as much ground as desired by being swung transversely and caused to be positioned the desired distance apart according to the type of plant being cultivated by having the shanks turned in respect to the arms and secured in the adjusted position.

What is claimed is:—

1. A sweep device for cultivators comprising a member including a shank disposed against the depending arm of a cultivator, clamping means engaging the shank and the arm for securing the shank in a rotatably adjusted position, a triangular blade having right angularly extending edges and a diagonal edge, means for pivotally connecting said blade at a point adjacent one of the right angularly extending edges and adjacent to the junction of said edges to the shank, and coacting means carried by the shank and blade for holding the blade in desired adjustment about its pivot.

2. A sweep device for cultivators comprising a member including a shank disposed against the depending arm of a cultivator, clamping means engaging the shank and the arm for securing the shank in a rotatably adjusted position, a triangular blade having right angularly extending edges and a diagonal edge, means for pivotally connecting said blade at a point adjacent one of the right angularly extending edges and adjacent to the junction of said edges to the shank, and coacting means carried by the shank and blade for holding the blade in desired adjustment about its pivot, said pivotal means comprising a removable pivot member to permit a reverse mounting of the blade with respect to the shank.

In testimony whereof I hereunto affix my signature.

STACHES T. VACEK.